United States Patent

[11] 3,568,874

[72] Inventors T. O. Paine
Administrator of the National Aeronautics and Space Administration with respect to an invention of;
Ewald Heer, La Canada; Calvin M. Beylik, Glendora; John A. Garba, Los Angeles; Frank W. Orlik, Manhattan Beach, Calif.
[21] Appl. No. 815,760
[22] Filed Apr. 14, 1969
[45] Patented Mar. 9, 1971

[54] PRESSURE SEAL
5 Claims, 5 Drawing Figs.
[52] U.S. Cl. ................................................... 220/46
[51] Int. Cl. ............................................... B65d 53/02
[50] Field of Search .......................................... 220/46, 46 (P)

[56] References Cited
UNITED STATES PATENTS
2,971,672  2/1961  Price .......................... 220/46(P)

FOREIGN PATENTS
1,004,712  9/1965  Great Britain ............... 220/46(P)

Primary Examiner—George E. Lowrance
Attorneys—J. H. Warden, Monte F. Mott and G. T. McCoy ABSTRACT: A pressure seal particularly suited for use in establishing a seal between a hermetically sealed test specimen and an associated test fixture disposed within an environmental test chamber, for purposes of subjecting the specimen to changing conditions of pressure and temperature, characterized by a rigid sealing member circumscribing an opening through which a vacuum is drawn, and an annular skirtlike, flexible sealing member formed of resilient and impervious material depending from the test fixture in circumscribing relationship with the rigid member in a manner such that pressure may be delivered from the specimen to the chamber, as a given positive pressure is established within the specimen, and a hermetic seal established therebetween as a given reduced pressure is established within the specimen for purposes of duplicating contemplated pressure conditions as may be encountered by a space craft as it approaches a celestial body enveloped in an atmosphere.

PATENTED MAR 9 1971   3,568,874
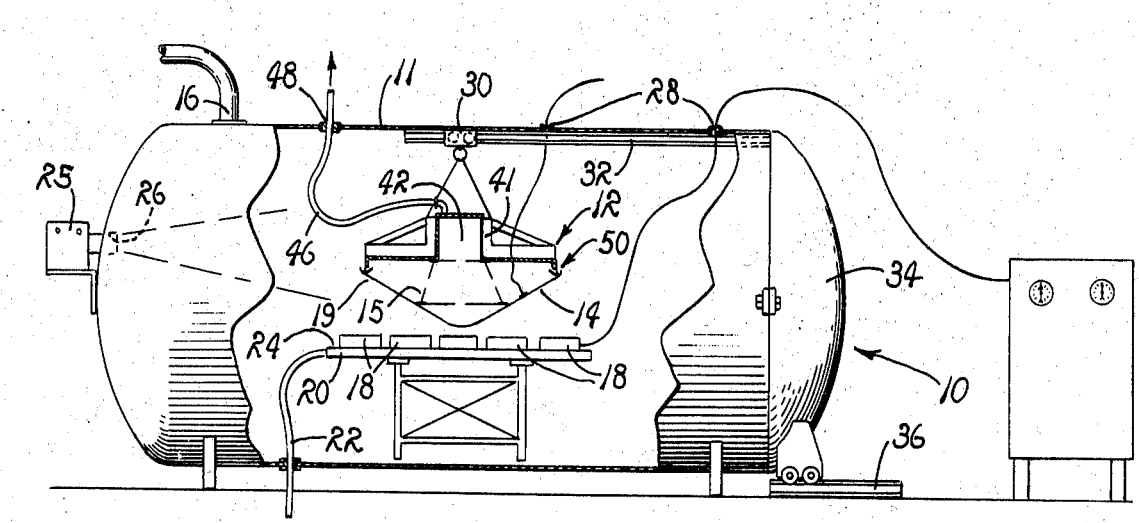
FIG.1.
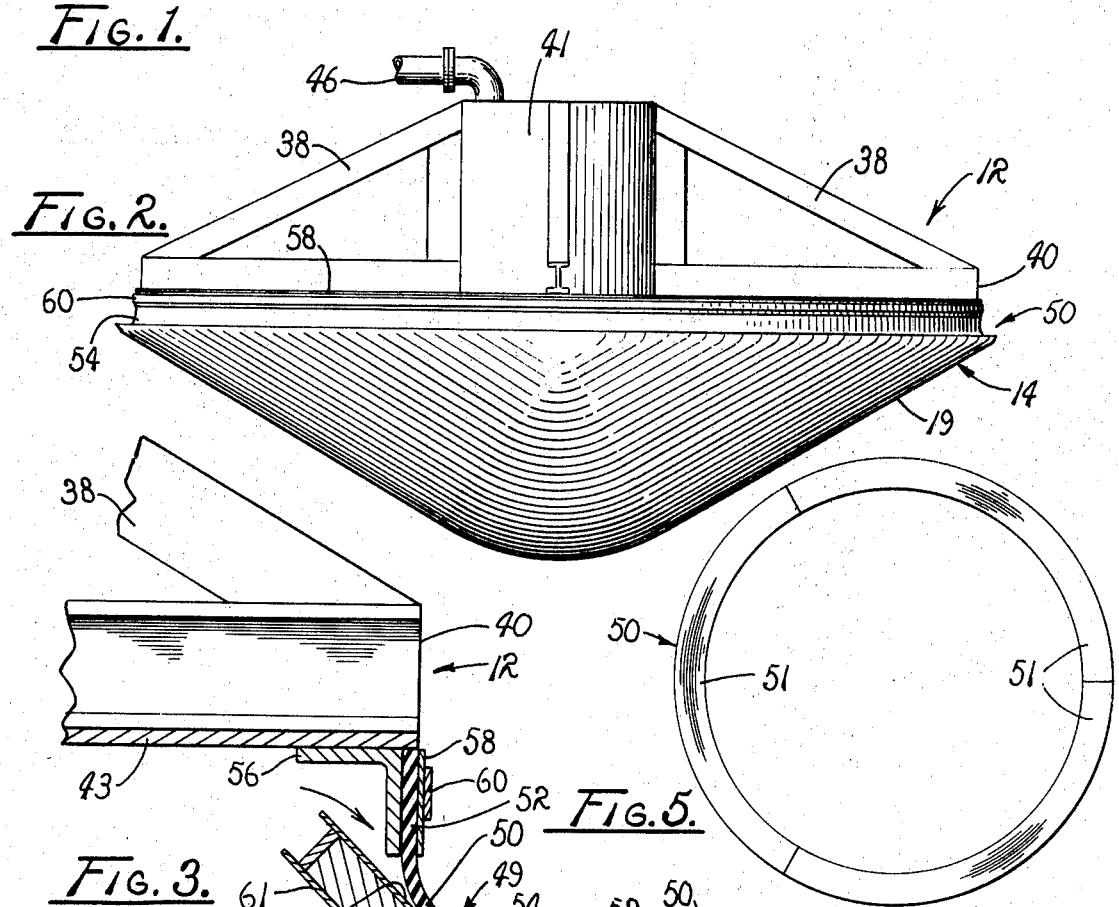
FIG.2.
FIG.3.
FIG.5.
FIG.4.
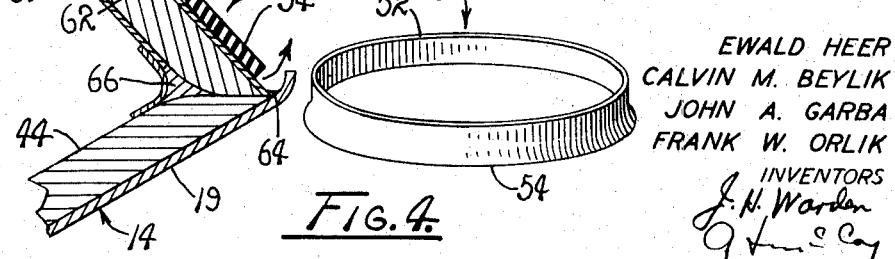
EWALD HEER
CALVIN M. BEYLIK
JOHN A. GARBA
FRANK W. ORLIK
INVENTORS
ATTORNEYS

PRESSURE SEAL

ORIGIN OF INVENTION

The invention described herein was made in the performance of work under a NASA contract and is subject to the provisions of Section 305 of the National Aeronautics and Space Act of 1958, Public Law 85—568 (72 Stat. 435; 42 USC 2457).

BACKGROUND OF THE INVENTION

1. Field of the Invention

The present invention relates generally to pressure seals for use in establishing hermetic seals and more particularly to a pressure seal for use in coupling test specimens to test fixtures within environmental chambers of the type employed in simulating changing theoretical or known conditions of temperature and pressure which are encountered as a spacecraft approaches a given celestial body enveloped in an atmosphere.

2. Description of the Prior Art

The prior art employs various types of sealing devices for sealing enclosures within the confines of environmental test chambers. Among the sealing devices employed in establishing hermetic seals between opposing surfaces of rigid bodies, such as closure members for test specimens having sealed compartments and the like, are gaskets formed from substantially impervious materials and operatively crushed or forced into deforming engagement between opposing rigid surfaces, whereby gastight seals are established therebetween. In most instances, seals thus established are maintained through cumbersome and often complex mechanical connections, and sealing thus achieved frequently is incomplete due to an occurrence of blowouts resulting from normally encountered "aging" or deterioration of the materials. This is particularly true where the seals are employed under conditions of extreme temperatures and pressures over extended periods of time.

The prior art also includes inflatable sealing members adapted to be inflated to assume an inflated condition between the rigid structural members to achieve the desired sealing. Here again, this type of seal frequently has not proven entirely satisfactory under changing conditions of extreme temperature and pressure, such as those conditions normally found in environmental test chambers.

Furthermore, where conditions established internally of a test chamber continuously are varied, such as where entry conditions are being simulated for bringing a spacecraft from the vacuum of outer space to the high pressures of planetary atmospheres, complex systems including pressure sensors and various types of actuators and relief valves have heretofore been required in establishing and monitoring pressure conditions established for test specimens.

OBJECTS AND SUMMARY OF THE INVENTION

The present invention overcomes the aforementioned difficulties through the use of an improved pressure seal, including a rigid annular seat mounted on the specimen and an annular flexible skirtlike sealing member mounted on the test fixture and extended to circumscribe and engage the rigid seat, while being adapted to open and close in response to preselected pressure differentials established across the seal for thereby simplifying a duplication of conditions of atmospheric entry wherein a spacecraft is subjected to continuously changing conditions of pressure ranging between those conditions wherein no pressure differential is established between the internal and external surfaces of the spacecraft and conditions wherein the pressures developed externally of the craft greatly exceed pressures established therewithin.

Accordingly, an object of the instant invention is to provide an improved sealing member for use in coupling test specimens to test fixtures within environmental test chambers.

Another object of the present invention is to provide an improved pressure seal for hermetically sealing test specimens mounted within environmental test chambers, which accommodate duplication of conditions of atmospheric entry for spacecraft.

Another object is to provide a pressure-responsive seal for use in an environmental test chamber, which opens and closes in response to preselected changes in established pressure conditions, whereby conditions of atmospheric entry for spacecraft test specimens may readily be duplicated.

BRIEF DESCRIPTION OF THE DRAWING

FIG. 1 is a partially sectioned elevational view of an environmental test chamber of a type utilized in duplicating spacecraft entry and reentry conditions and illustrating an operative coupling of a test specimen with a test fixture wherein a pressure seal embodying the principles of the present invention is employed.

FIG. 2 is a side view, on a somewhat enlarged scale, of a test specimen mounted on a test fixture illustrated in FIG. 1.

FIG. 3 is a fragmentary view, taken near the junction of the test fixture and a test specimen illustrating, on an enlarged scale, the pressure seal shown in FIGS. 1 and 2.

FIG. 4 is a perspective view of the flexible sealing member, in a relaxed configuration, employed by the pressure seal illustrated in FIG. 3.

FIG. 5 is a plan view of an assembly of a plurality of coplanar segments employed in fabricating the flexible sealing member, illustrated in FIG. 4.

DESCRIPTION OF THE PREFERRED EMBODIMENT

Turning to FIG. 1, there is illustrated an environmental test chamber 10 defined by a sealable shell 11 having mounted therein a test fixture 12. The test fixture serves to support a test specimen 14 mounted in a depending relationship therewith through convenient mounting members 15 conveniently coupled therebetween. The test specimen, as illustrated, is an aeroshell intended to provide an entry shield for a spacecraft as the spacecraft approaches a given celestial body enveloped in a gaseous atmosphere.

The test specimen 14 is, in testing, subjected to a range of various pressure established within the chamber through an introduction of pressurized gas delivered via a pressure supply port 16 formed in the shell 11. Simultaneously with pressurization, the specimen is subjected to heat flux applied thereto through a plurality of high intensity lamps 18. In practice, the lamps 18 are arranged in banks and are disposed beneath the external surface 19 of the specimen 14 so that outgassing of the test specimen will not result in rising gases which, as a practical matter, tend to interfere with the heat flux provided by the lamps. While the bank of lamps forms no specific part of the present invention, it is to be understood that normally the lamps are supported on a cooling plate 20 and cooled as a coolant is circulated through a conduit 22 operatively coupled thereto. Where desired, reflecting surfaces 24 are employed with the lamps for directing the heat flux to the surface of the test specimen.

Since it is important that the test specimen continuously be monitored throughout its simulated entry into atmosphere, a photographic device such as a movie camera 25 is mounted to "look" through a conveniently formed port 26 formed in the shell 11, while a plurality of various electrical connections are made with the specimen and associated equipment through the use of electrical leads extended through convenient openings 28. As the monitoring circuitry employed forms no specific part of the instant invention, a detailed description is omitted in the interest of brevity.

The fixture 12 normally is suspended from a track-guided roller support 30, which, in turn, operatively is supported in rolling engagement with a convenient overhead track 32. The track is fixed to the shell 11 of the chamber 10 and extends to an opening forming the door for the chamber so that the test specimen 14 may be coupled with the test fixture and located within the test chamber at a position directly above the lamps 18. A door 34 is provided for sealing the chamber. In practice, the door is supported for displacement along a convenient track 36 and is adapted to be displaced relative to the opening of the chamber for effecting a sealing closure therefor.

The fixture 12 is of a design which includes a plurality of inclined and radially extended spiderlike truss members 38, FIG. 2, interconnected at their distal ends through connecting members 40. The innermost end portions of the truss members are connected with the external surface of a hermetically sealed cylindrical housing 41 defining therewithin a sealable vacuum chamber 42.

The wall of the housing 41, at the lowermost end of the chamber 42 is sealingly joined to an annular plate 43 which extends laterally therefrom. The wall of the housing circumscribes a convenient opening, not designated, formed in the plate so that the chamber 42 is mounted in communication with the internal surfaces 44 of the test specimen 14, whereby vacuumization of the internal surfaces may be achieved by vacuumizing the chamber 42. The vacuum chamber 42, in turn, is connected to a vacuum pump, not shown, through a convenient pressure conduit 46 which extends through the shell of the chamber 10 via a conveniently sealed port 48.

In practice, it is intended that the shell 11 of the chamber 10 be sealed at the door 34, and that gas under pressure be delivered to the chamber, through the supply port 16, while a vacuum selectively is drawn through the chamber 42 thus to establish a desired differential in the pressures simultaneously applied to the internal surfaces 44 and the external surfaces 19 of the test specimen 14. This established pressure differential is so controlled as to represent an operative environmental condition as is "seen" by a spacecraft entering the atmosphere of any celestial body.

To achieve the desired control, a pressure seal 49 which embodies the principles of the present invention, is provided. The seal 49 includes a flexible sealing member 50 disposed or draped to extend downwardly from the fixture into sealing engagement with the test specimen in a manner such that as pressure is reduced within the chamber 42, below a predetermined value, and/or pressure is increased within the test chamber 10, the member 50 is displaced and thereby rendered effective for establishing a hermetic seal between the fixture and the specimen.

As better illustrated in FIGS. 2, 3 and 4, the flexible member 50 is of an annular configuration defining a band formed from a flexible and resilient material draped from the fixture. As better illustrated in FIG. 5, the member 50 is formed by cutting arcuate sections 51 from a sheet of neoprene stock and then joining the sections, by vulcanizing, to form a flattened, relaxed ring. Therefore, it should readily be apparent that the inside and outside diameters of the resultant annular member vary substantially and that the member may be caused to assume a truncated conical configuration.

While exaggerated for illustrative purposes, the ring 50, as illustrated in FIG. 4, includes a body portion 52 and a skirt portion 54 with the skirt portion terminating along the surface having the greater diameter. The body portion, having the smaller diameter, is mounted on an annular support ring 56 circumscribing the periphery of the plate 43. It is important to note that when the sealing member is relaxed, as illustrated in FIG. 4, the diameter of the body portion 52 thereof is substantially less than the diameter of the skirt portion 54 so that the body portion may be mounted by being stretched over and seated on the support ring 56 without introducing significant stress in the skirt portion. The skirt, therefore, is draped and maintained in a relaxed state, whereby its sealing characteristics are enhanced as a pressure differential is developed across the test specimen and between the pressure of the chamber 42 and the pressure of the pressure chamber 10.

In addition to employing the resilient memory forces of the neoprene material, achieved by stretching the member 50, for securing the member about the supporting ring 56, an aluminum binding strap 58 is positioned in binding engagement with the external surfaces of the sealing member 50 and is secured in place through a stainless steel band 60.

While numerous specimens of a type conforming to an open-topped container could be mounted on and secured to a fixture which utilizes the pressure seal 49, as illustrated, and as presently utilized, the pressure is employed to establish a hermetic seal between an aeroshell test specimen 14 and the fixture 12.

Mounted to cooperate with the member 50 to aid in achieving the desired hermetic seal, there is provided a rigid sealing member 61 having an annular configuration and external sealing surface forming an annular seat 62 extending about the periphery of the aeroshell and extended inwardly thereof. The rigid sealing member is coupled with the aeroshell in any convenient manner such as through means including a weld 64 and a convenient sealing material 66 which serves to assure establishing of a hermetic seal between the member 61 and the internal surface of the aeroshell.

The sealing seat 62 of the member 61, when operatively disposed, is in deflecting engagement with the internal surfaces of the skirt 54 so as to retain the skirt in a deflected configuration, FIG. 3, whereby pressure established within the chamber 10 serves to act against the external surface of the skirt and force the internal surface of the skirt into engagement with the annular seat. As the flexible sealing member 50 is fabricated in a manner such that the body portion 52 has a diameter substantially less than that of the skirt 54, an operative deflection thereof does not establish significant stresses within the flexible skirt. Consequently, a high degree of resilience and flexibility is retained by the flexible sealing member 50 when it is seated in operative engagement with the seat 62 of the sealing member 61.

Furthermore, it should be appreciated that by varying the extent of imposed deflection of the skirt 54, the pressure differentials required to establish a hermetic seal between the surface 62 and the inner surface of the skirt 54 may be varied, as desired, thus to impart a high degree of versatility to the pressure seal.

OPERATION

It is believed that in view of the foregoing description, the operation of the device will be readily understood and it will be briefly reviewed at this point.

It should be apparent that various open-topped containers operatively could be sealed employing the seal of the present invention. However, for purposes of illustrating the operation of the instant invention, it will be assumed that an aeroshell of a generally inverted conical configuration is coupled to the test fixture 12 and suspended in an operatively sealed environmental test chamber 10. Beneath the external surface 19 of the aeroshell there is the bank of high intensity lamps 18 which serve to establish the required heat flux, while a positive pressure is introduced into the chamber by delivering suitable gases, such as nitrogen, under pressure, through the port 16. The rigid sealing member 61, connected to specimen 14, is disposed adjacent to the test fixture in deflecting engagement with the skirt 54 of the flexible sealing member 50.

Should the pressure within the test specimen 14 be increased above that present within the test chamber 10, the sealing members 50 and 61 of the pressure seal 49 permit gases to escape outwardly, as indicated by the arrows in FIG. 3, into the chamber 10. However, as a pressure within the chamber 10 is increased above that established within the specimen, the skirt 54 is forced into sealing engagement with the seat surface 62 of the rigid sealing member 61. As the sealing pressure differentials increase, the sealing characteristics of the seal 50, acting in cooperation with the surface 62, also increase for positively forming a hermetic seal between the internal portions of the test chamber 10 and the internal portions of the test specimen 14. Therefore, the pressure seal 49 disposed between the test fixture and the aeroshell closes automatically and a time dependent pressure differential is established across the aeroshell, in a controlled manner for thereby simulating entry of the aeroshell into the atmosphere of a celestial body. Should it be deemed advisable, for purposes of simulating entry conditions, the flow of gases established through the conduit 46 may be revised so that the pressures within the test specimen are increased for thereby representing a withdrawal from the encountered atmosphere.

Until such time as a zero pressure differential is established between the surfaces of the aeroshell, the pressure increase within the aeroshell may be conveniently continued. However, where the pressure within the aeroshell is caused to exceed the pressure within the test chamber, the pressure seal 49 automatically releases the pressure within the aeroshell permitting the pressure to escape into the chamber 10, whereby a series of theoretically encountered pressure conditions may be selectively established by varying the pressures between the external and internal surface of the test fixture for thereby establishing a pressure history of a controlled configuration and representing a selected encounter with a given celestial body.

In view of the foregoing, it should be apparent that the present invention provides a pressure seal which has particular utility in environmental test chambers for establishing conditions simulating entry into planetary atmospheres and is adapted automatically to close, and to open, in response to encountered conditions representing theoretical pressure conditions encountered by a craft as it is approaching a celestial body.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

We claim:

1. In a test fixture for use in a positively pressurized environmental test chamber and including means for coupling the fixture with a sealed test specimen of a type adapted to be negatively pressurized through the test fixture in the presence of positive ambient pressure for thereby simulating theoretical conditions of pressure differential encountered in a spacecraft entry into an atmosphere, a pressure seal comprising:
   A. a flexible, resilient sealing member having a stressed body and an unstressed skirt including a sealing surface extending between the test fixture and a test specimen; and
   B. an inclined rigid sealing member including means defining a seal seat coupled with the test specimen and extended into deflecting engagement with a sealing surface of the depending skirt, whereby as pressures established within the environmental test chamber are varied with respect to pressures established within the specimen, the established pressure differential serves to force the skirt into engagement with the seal seat for thereby establishing a hermetic seal therebetween.

2. The pressure seal of claim 1 wherein the flexible sealing member comprises a flat annular member formed of a plurality of arcuate segments interconnected at the opposite ends thereof to form a planar annular member adapted to establish an annular member substantially conforming to a truncated conical configuration when arranged in an operative disposition.

3. A pressure seal for hermetically sealing a container having an open top and a cover member disposed adjacent thereto comprising:
   A. a mounting defined by an annular support ring of a substantially rigid configuration depending from the cover member;
   B. a rigid sealing member including an annular ring defining an open top for the container having an inclined surface defining a sealing seat; and
   C. a flexible sealing member formed of a resilient, flexible and impervious material including an annular body stretched within its elastic limits and seated on said mounting in a circumscribing relationship therewith and a skirt portion depending in a relaxed state from said body having a first and second mutually opposed surface, said first surface being extended into circumscribing engagement with said seal seat, whereby as the second surface is subjected to a pressure of a magnitude greater than that of the pressure to which the first surface is subjected, said first surface is forced into sealing engagement with the seat for establishing an hermetic seal between the container and the cover member.

4. The pressure seal according to claim 3 wherein the flexible sealing member is formed of a plurality of interconnected, arcuate coplanar segments coupled into planar impervious member having an annular configuration and including an annular body portion arranged adjacent the skirt portion.

5. A pressure-responsive sealing member having a truncated conical configuration including:
   A. a stressed annular body portion formed of a resilient, flexible material and having a given diameter mounted on a rigid support;
   B. a flexible, impervious unstressed skirt portion depending from the body; and
   C. an annular rigid sealing member including an annular seat adapted to receive the skirt in sealing engagement therewith in the presence of a pressure differential established between the opposite surfaces thereof.